(12) United States Patent
Schilling et al.

(10) Patent No.: US 8,846,128 B2
(45) Date of Patent: Sep. 30, 2014

(54) METHOD OF PRODUCING GRANULATED AND POWDERED MOCHI-LIKE FOOD PRODUCT AND WHEAT FLOUR SUBSTITUTE

(71) Applicants: Robert Louis Schilling, San Rafael, CA (US); Jennifer Schilling, San Rafael, CA (US)

(72) Inventors: Robert Louis Schilling, San Rafael, CA (US); Jennifer Schilling, San Rafael, CA (US)

( * ) Notice: Subject to any disclaimer, the term of this patent is extended or adjusted under 35 U.S.C. 154(b) by 50 days.

(21) Appl. No.: 13/645,497

(22) Filed: Oct. 4, 2012

(65) Prior Publication Data

US 2014/0099424 A1    Apr. 10, 2014

(51) Int. Cl.
*A23L 1/10*    (2006.01)
(52) U.S. Cl.
USPC ........... 426/618; 426/459; 426/518; 426/622; 426/629
(58) Field of Classification Search
CPC ......... A23L 1/20; A23L 1/182; A23L 1/1033; A23L 1/1041; A23L 1/1025; A23D 2/00; C12C 7/00
USPC .................................. 426/518, 618, 622, 629
See application file for complete search history.

(56) References Cited

U.S. PATENT DOCUMENTS 7,022,369 B1 * 4/2006 Kleinman ..................... 426/634

FOREIGN PATENT DOCUMENTS

| JP | 2005/168444 A | * | 6/2005 |
| KR | 20030020340 | * | 3/2003 |
| KR | 2011/0009764 | * | 1/2011 |

* cited by examiner

*Primary Examiner* — Helen F Heggestad

(57) ABSTRACT

In one embodiment, unpolished sweet rice, a.k.a. glutinous rice, is processed to yield a powdered or granulated product which provides more than one unique advantage when applied as a substitute for traditional mochi or wheat flour as an ingredient for producing pancakes and baked goods. The sweet rice is processed by sprouting it, dehydrating it, roasting it, cooling it, and finally pulverizing it to provide flour or meal. The flour or meal is then made into comestibles by combining with other ingredients and baking or frying, according to adapted recipes. Non-glutinous varieties of unpolished rice, a.k.a. brown rice, may also be processed according to this method to yield rice flour with a distinctive, nutty flavor and stabilized rice bran.

4 Claims, 1 Drawing Sheet

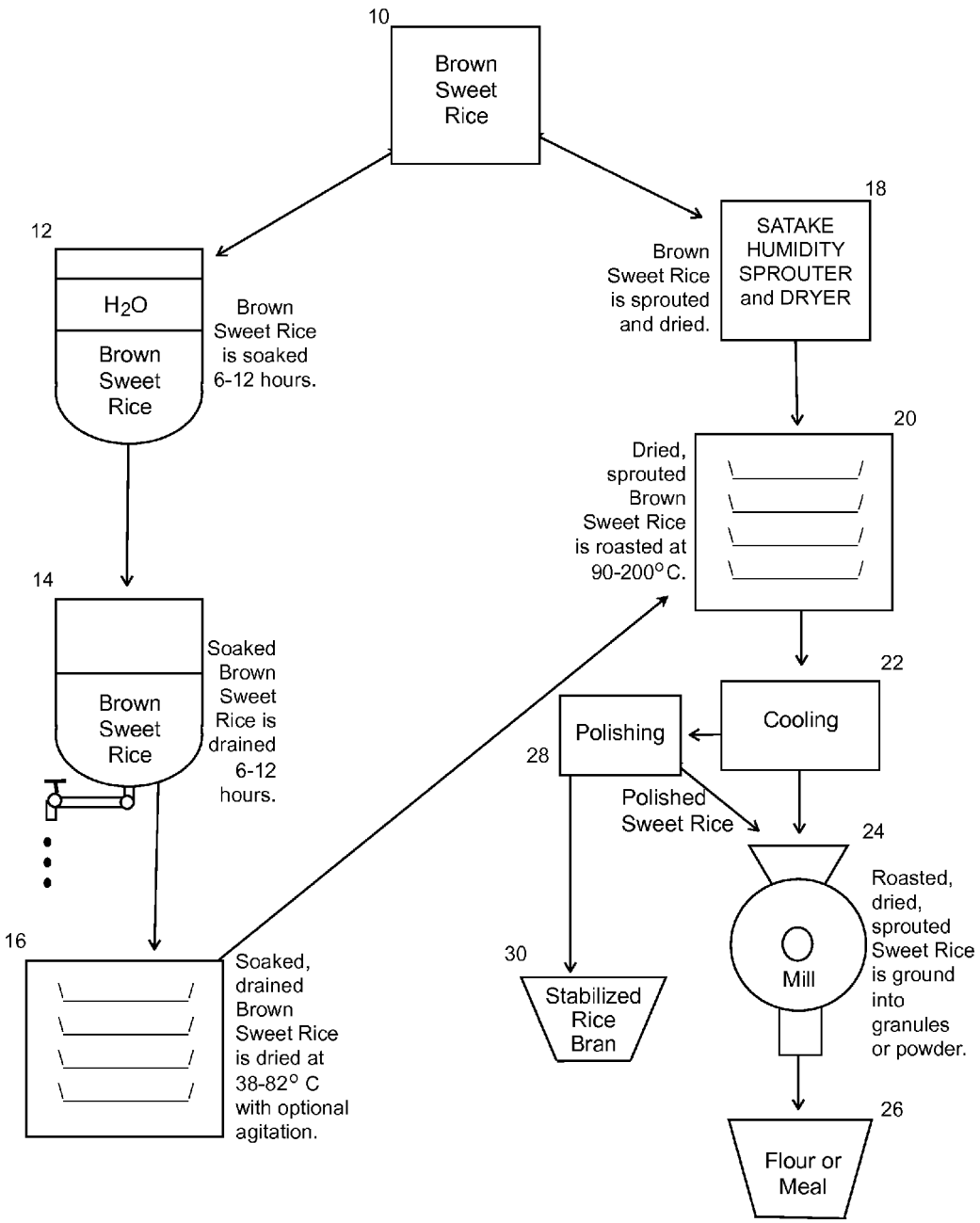

METHOD OF PRODUCING GRANULATED AND POWDERED MOCHI-LIKE FOOD PRODUCT AND WHEAT FLOUR SUBSTITUTE

CROSS REFERENCE TO RELATED APPLICATION

This application claims the benefit of PPA Ser. No. 61/543,570, Filed Oct. 5, 2011, by the present inventors, which is incorporated by reference.

BACKGROUND

1. Prior Art

As is known, bakery products are commonly made from wheat flour containing gluten, which contributes to the typical texture, flavor, and form of the usual pancake, bread, and cake products. There are, however, circumstances in which wheat flour is not readily available or cannot be used for the production of baked products.

E.g., a segment of the population suffers from dietary wheat intolerance, which includes disturbances such as classical celiac disease and related, less well-defined wheat intolerances and allergies. All are expressed by gastrointestinal disturbances, which make wheat-based products unacceptable for use. Similarly, Jewish dietary laws strictly prohibit the common use of wheat flour and its leavened products during the eight-day period of the Jewish holiday, Passover.

The prior art has addressed this circumstance by replacing wheat flour with various combinations of other finely milled grains, e.g., rice, sweet rice, and millet flour. Also beans, e.g., soy, fava, and garbanzo bean flours have been used. In addition, bakers have added root starches, e.g., arrowroot, tapioca, potato and yam, and gluten substitutes such as xanthan gum, guar gum, locust-beam gum, alginate, pregelatinized starch, and carboxymethylcellulose.

Mochi, a traditional Japanese food normally made from steamed and pounded brown or white sweet rice, is favored by many such gluten-intolerant individuals and is commonly used as a wheat-free staple food. In the U.S., traditional mochi is available for purchase in natural foods markets and stores specializing in Asian foods. Mochi is normally formed into a slab that is wrapped in plastic and sold in the refrigerated section. Being a refrigerated product, traditional mochi is perishable, with a shelf-life of about 120 days, and remains usable for only a few days after it is opened.

At least one brand of mochi is available in a limited selection of flavors, containing various ingredients added during the manufacturing process to produce a variety of tastes and textures.

Traditional mochi is prepared by cutting it into pieces and baking, steaming, or frying it. When it is heated, mochi softens and expands, often forming a hollow pillow shape.

Because of its non-fluid nature, it would be difficult and impractical for the consumer to incorporate additional ingredients into mochi in the traditional form as it is purchased in the market.

2. Advantages

In one embodiment, a single ingredient, sweet rice, a.k.a., glutinous rice, is processed into a substance which will, with certain recipe adjustments, yield satisfactory results as a wheat flour substitute in certain recipes and situations, notably, cakes, cookies and pancakes.

The absence of a more complicated combination of ingredients decreases the likeliness that an individual consuming a food item prepared with the product of the present embodiment will suffer adverse effects of an allergy or food sensitivity to an ingredient.

When applying the process of the present embodiment to whole-grain (brown) rice, an additional benefit is that sprouting the rice, as part of the process, increases the content of sugar, fiber, vitamin C and Gamma-AminButyric Acid (GABA), a desirable amino acid, in the grain Being in a dry, roasted, powdered or granulated state, the product of the present embodiment has a shelf life of one year or longer. The roasting step of the process stabilizes the rice bran and extends the shelf life of the final product or of the rice bran, if it is removed before grinding the processed rice into flour.

Although sweet rice has often been referred to as "glutinous rice" because it has a sticky texture when cooked, it actually contains no gluten, and, therefore, does not normally cause allergic reactions when consumed by gluten-intolerant individuals. Additionally, the process described enhances the inherent sticky texture of the sweet rice, yielding a uniquely close approximation of the glutinous texture of dough or batter made with wheat flour, which is favored in certain applications.

A variety of favored ingredients may be easily added to recipes utilizing the present embodiment.

SUMMARY

A method of processing rice comprises sprouting, dehydrating, roasting, cooling and grinding the rice to produce a unique, granulated or powdered product which can be used as an ingredient in preparing a variety of gluten-free cakes, pancakes and other foodstuffs.

DRAWINGS

The single sheet of drawing is a flowchart which diagrams of the steps of the process.

DETAILED DESCRIPTION

Conversion of Brown Sweet Rice

Sweet rice (*Oryza sativa* var. *glutinosa* or *Oryza glutinosa*; also called sticky rice, glutinous rice, waxy rice, botan rice, biroin chal, mochi rice, pearl rice, and pulut) is a type of Asian rice that is especially sticky when cooked. It is called glutinous (<Latin glūtinōsus) in the sense of being glue-like or sticky and not in the sense of containing gluten. Sweet rice is distinguished from other types of rice by having no (or negligible amounts of) amylose, and high amounts of amylopectin (those are the two components of starch). Amylopectin is responsible for the sticky quality of glutinous rice. The difference has been traced to a single mutation that was selected for by farmers. There are several types of sweet rice, including brown, black and white sweet rice. Brown sweet rice is sweet rice that is still in its unpolished state, with its bran layer intact, so called because the bran layer, while not a true brown, is brownish and darker in color than polished sweet rice. Black sweet rice, also called simply, "black rice" or "purple rice" is an Asian variety of sweet rice. Sweet rice can be used either polished or unpolished (that is, with the bran removed or not removed), but the present process begins with the bran not removed. Polished glutinous rice is white in color and fully opaque (unlike non-glutinous rice varieties, which are somewhat translucent when raw), and is referred to as "white sweet rice". The term "brown rice" commonly refers to unpolished, non-glutinous rice.

With respect to rice and other cereal grains, the word, "milling" is commonly used to describe two distinctly different processes, (1) removal of the bran layer and (2) grinding or otherwise pulverizing the grains into flour or meal. In order to avoid confusion, this application will consistently use the terms polishing and grinding, respectively, when referring to these processes.

Sprouting

The process for manufacturing the present granulated or powdered mochi-like food product and wheat flour substitute begins with sprouting rice, employing either of two methods. These are illustrated by alternative paths in the flowchart of the drawing. As can be seen in the flowchart, the process is started with unpolished sweet rice (block 10). While sweet rice is required for producing said mochi-like food product, and the process will be described with respect to sweet rice, this process may be applied to most or all varieties of unpolished rice, either glutinous or non glutinous, with useful and advantageous results, e.g., superior flavor, nutritional content and extended shelf-life—characteristics which are unattainable by using traditional methods. Sweet rice and many types of non-glutinous rice are commonly available as hulled, whole grain food staples. One producer of sweet rice and other types of rice is Lundberg Family Farms of Richvale, Calif.

The Soaking Method of Sprouting:

According to the soaking method (left side of flowchart), a quantity of brown sweet rice, e.g., 10 kg, is soaked in water for a period of six to twelve hours (block 12). The volume of the soaking vessel and the volume of water should both be at least 50% greater than the volume of the rice, since the rice will absorb water and expand during the soaking process. After soaking (block 14), the water is drained and the rice is allowed to sit for six to twelve hours, as it will continue to absorb the residual water. Under these conditions, the brown sweet rice will naturally undergo the biological activity commonly known as sprouting or germination, wherein the individual grains of sweet rice, which are seeds, will transform from a dormant state and begin growing. Nutritional changes occur, including, but not limited to increased dietary fiber, magnesium, potassium, zinc, Vitamin E and certain B vitamins. Additionally, sprouting changes the texture of the sweet rice and this change is extended to the ultimate, granulated or powdered product of this process, such that a uniquely favorable taste and texture are achieved upon preparing recipes with this product.

Drying

After sprouting is completed by the soaking method, the brown sweet rice is dried (block 16) utilizing a mechanical dryer or a heated environment, such as that provided by an oven or a food dehydrator, with the temperature set at about 38° to 82° C. The length of time needed to dry the product depends upon several factors, including the temperature of the environment and the quantity and configuration of the product being dried. In one example, the sprouted sweet rice was dried at 82° C. for 7.5 hours. The product can be tested for completeness of drying by mechanically crushing one or more of the sweet rice grains. The product may be considered sufficiently dried when crushing reveals a dry, brittle interior of the grain.

The rice preferably is spread in the dryer in a shallow layer, e.g., 1.3 cm deep, for a time as indicated below. The dryer may also be arranged to agitate the rice.

Thereafter the dried rice is further processed, as will be explained infra. However, before discussing the further processing, we will describe the alternative method of sprouting.

Humidity Method of Sprouting:

The second method of sprouting is humidity rice sprouting, which is depicted on the right side of the flowchart and described in U.S Published Patent Application US 2007/0196559, dated Feb. 16, 2007, to Takeshi Fukumori. Fukumori relates to the sprouting and drying of non-glutinous brown rice, but I have found that the process described therein can also be used to sprout brown sweet rice. According to that patent, the brown rice is processed thusly:

"By use of a device having a construction similar to that of a grain dryer, high-humidity air is applied to brown rice that is being transferred in a circulating manner through the device, the moisture of the brown rice is increased at water addition rates of 0.1 to 0.3%/hour in the range of 16.5 to 18.5% and the brown rice is thereafter left at rest in the device, in a state where blowing of air and circulated transfer of the brown rice are stopped. As a result, the functional component of γ-aminobutyric acid (GABA) contained in the brown rice is increased".

The rice is sprouted and dried in a mechanical device developed and manufactured by the Satake Corporation of Japan, by exposure to a warm, moist environment as an alternative to the traditional soaking method, and dried (block 18). Several nutritional and taste advantages are claimed for brown rice subjected to this process. Biological, nutritional and textural changes occur, similar to those achieved by utilizing the soaking method of sprouting.

The mechanical sprouter developed by the Satake Corporation, which utilizes the process described in the Fukumori Application, incorporates a drying cycle; hence no separate drying step is included on the right side of the chart.

Roasting

After drying sweet rice sprouted by the soaking method and dried, or sprouted and dried by the humidity method, the sweet rice is roasted to a light brown color, utilizing an oven or a mechanical roaster, in which the product is heated to a temperature at about 90° to 200° C. (block 20). In one example, the sprouted, dried sweet rice was spread on trays to a depth of about 1.3 cm and roasted on in an oven at 115° C. for a period of 30 minutes. The product is removed from the roaster or heated environment when a light brown color is achieved. The roasting process improves the flavor of the finished product and stabilizes the oil which is present in the outer layer of the rice grains, commonly referred to as bran. In the absence of the roasting process, the bran oil typically undergoes oxidation, which is commonly known as rancidity. Rancidity is generally considered undesirable because it negatively impacts the taste, nutritional content and digestibility of the product. In the absence of stabilization of the bran by means of heating or enzyme treatment, rancidity of the bran oil proceeds at a dramatically accelerated rate after the bran is separated from the rice by polishing.

Cooling

The sweet rice is cooled to below 27° C. (block 22). Cooling is effected by removing the sweet rice from the heated environment and allowing it to cool in an environment that is at or below 27° C.

Polishing

After cooling, the sweet rice may optionally be fully or partially polished according to well-known polishing techniques used to convert brown rice to white rice to remove some or all of its bran for a lighter product, according to taste and dietary preference (block 28). The stabilized rice bran may be retained for nutritional or industrial use (block 30).

Grinding

In the final stage, the rice is either finely ground into flour or coarsely ground into granules or meal (block 24) according to the utilization method. The grinder uses a roller mill, burr mill, attrition mill, disintegrator mill, hammer mill, or other mechanical device, all of which are well-known. E.g., if the rice is to be used for cakes or cookies, it should be ground to a flour, but if it is to be used for mochi pancakes, it may be ground to a meal (block 24), although flour is also usable for this purpose.

Utilization

A mochi-like food item may conveniently be prepared by mixing the granulated or powdered product of glutinous rice, prepared according to the present process, with any one or combination of various potable liquids, e.g., water, milk, broth, juice, gravy, or artificial milk (soy, almond, etc), to form a batter, which can be baked or fried to form either sweet or savory pancakes. The most basic recipe for mochi pancakes may be prepared by mixing approximately equal volumes of water or other liquid with the granulated or powdered flour to form a batter. The proportion may be adjusted for consistency and personal preference. The batter is spooned onto a hot, oiled or buttered griddle, and turned occasionally, as the pancake solidifies, until both sides of the pancake are noticeably brown in color. Optional ingredients may be added to the batter before frying, including, but not limited to, salt, sugar, mashed banana, applesauce, egg, herbs, spices, pieces of fresh or dried fruit, vegetables, meat (including ersatz), and cheese (including ersatz). The glutinous rice processed in this prescribed method has a unique sticky texture, so that the usual necessity of using eggs or gluten as binding agents can be eliminated.

The powdered flour may be mixed with sugar, eggs, milk, cream or water, oil or butter, salt and baking powder and other ingredients and baked to produce cakes or cookies which serve as a satisfactory substitute for wheat flour cakes and cookies. Making pancakes or baked goods yields a finished product with unique taste and texture qualities unattainable through the use of simple sweet rice flour.

CONCLUSIONS, RAMIFICATIONS, AND SCOPE

It has been shown that at least one embodiment provides a more convenient, more nutritious and less allergenic wheat flour and mochi substitute, which can be utilized in multiple applications. Creative chefs and food entrepreneurs may develop new and interesting products and recipes utilizing this unique and versatile food staple.

While the above description contains many specificities, these should not be construed as limitations on the scope, but as exemplifications of some present embodiments. Many other ramifications and variations are possible within the teachings. Thus the scope should be determined by the appended claims and their legal equivalents, and not by the examples given. For example, the sprouting, drying and roasting process may be applied, with certain advantages to other types of unpolished rice, e.g., several varieties of black rice and red rice and other types of brown rice, e.g., short grain, medium grain, long grain, basmati, jasmine rice, etc. The pre-stabilized bran may be polished from the rice after roasting, or the roasted, unpolished rice may be ground into wholegrain rice flour or meal with the advantages of increased shelf-life and a distinctive, nutty flavor difference, which some consumers prefer for certain applications, e.g., baked goods and hot cereal may be made with short-grain brown rice processed in this way.

We claim:

1. A process for producing a granulated or powdered product from only unpolished sweet, glutinous rice, which serves as an ingredient in preparing a gluten-free wheat flour substitute, consisting of:
    a. sprouting a quantity of said sweet glutinous rice in a warm, humid environment for a prescribed period to provide sprouted rice,
    b. drying said sprouted sweet glutinous rice to provide dried and sprouted sweet rice,
    c. roasting said dried sprouted sweet glutinous rice to provide roasted, dried, and sprouted sweet rice,
    d. cooling said roasted dried sprouted sweet glutinous rice, and
    e. utilizing a mechanical device to pulverize said roasted, dried, and sprouted sweet glutinous rice to provide a flour or meal wherein the flour or meal produced from the said process is used to make products from the group consisting of baked goods, fried goods, and pancakes.

2. The process of claim 1 wherein said roasted, dried, and sprouted sweet glutinous rice is polished to provide polished sprouted sweet rice and stabilized sweet rice bran.

3. The products made by the process of claim 2.

4. The products made by the process of claim 1.

* * * * *